INVENTOR
PAUL KLUWE

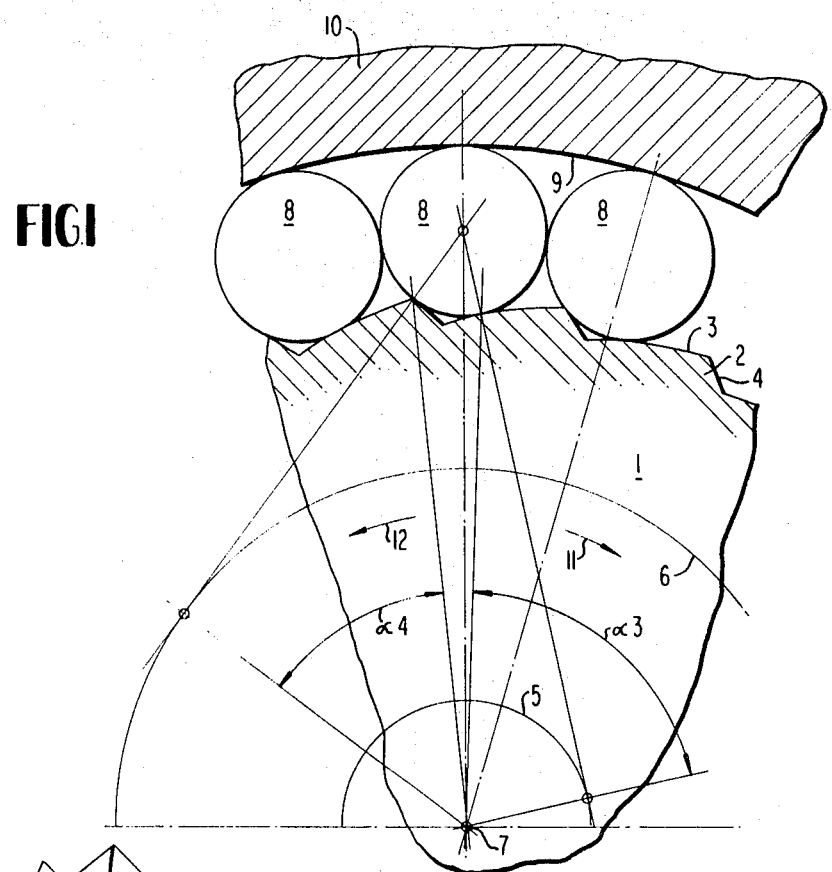
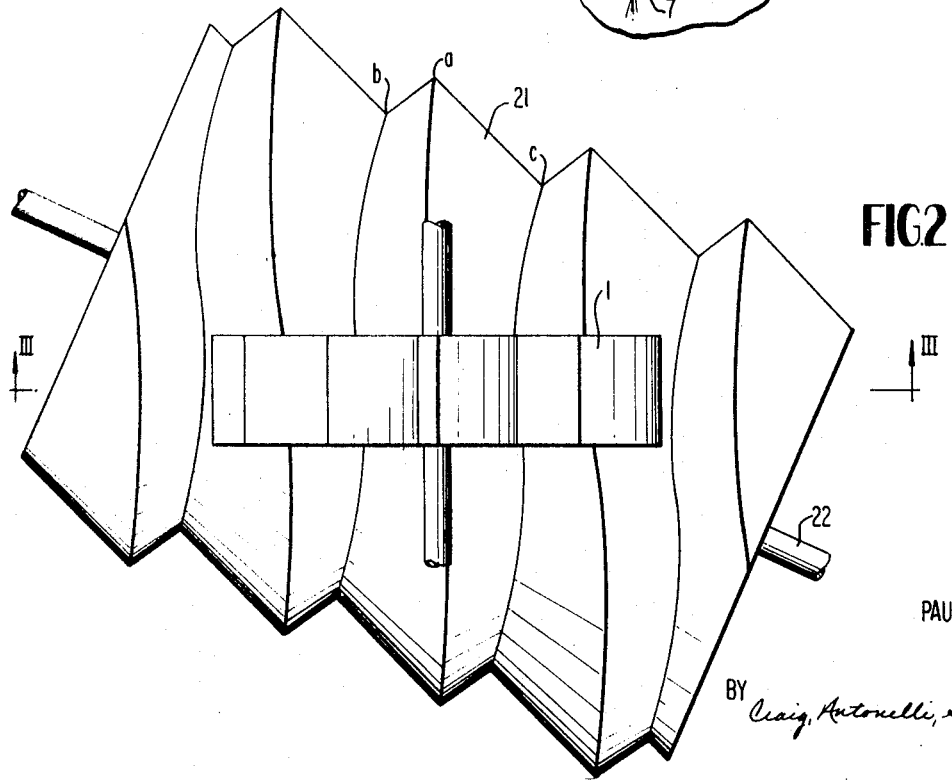

United States Patent Office 3,626,569
Patented Dec. 14, 1971

3,626,569
FREE-WHEELING DEVICE
Paul Kluwe, Fellbach, near Stuttgart, Germany, assignor to Daimler-Benz Aktiengesellschaft, Stuttgart-Untertuerkheim, Germany
Continuation-in-part of application Ser. No. 515,767, Sept. 14, 1965, which is a division of application Ser. No. 3,189, Jan. 18, 1960, now Patent No. 3,249,186. This application Mar. 17, 1970, Ser. No. 20,298
Int. Cl. B21d 53/26
U.S. Cl. 29—159
9 Claims

ABSTRACT OF THE DISCLOSURE

A method of manufacturing a one-way roller element wedging clutch having an outer element with a cylindrical bore, an inner element with a toothed caming surface opposing the cylindrical bore, and a plurality of roller elements therebetween wherein the toothed surface is formed in one continuous step by a single surface hob by simultaneously rotating the hub and a gear blank, embedding the hob teeth in the gear blank and grinding the gear blank by the abrasive surface of the hob teeth.

CROSS-REFERENCE TO RELATED APPLICATIONS

This application is a continuation-in-part of application Ser. No. 515,767, filed Sept. 14, 1965, which is a division of application Ser. No. 3,189, filed Jan. 18, 1960, now U.S. Pat. No. 3,249,186, the disclosure of which is incorporated in its entirety by reference.

BACKGROUND OF THE INVENTION

Wedging-roller-type free-wheeling clutches of known construction include, in addition to the free-wheeling elements properly speaking, among others, cages, torsion springs, retaining pins, levers and the like. Consequently, the main structural parts of the free-wheeling devices of the prior art have to be provided with bores, recesses or the like for the accommodation of the auxiliary parts which weaken the main structural parts insofar as loading and possible stressing thereof is concerned, and additionally increases the cost of manufacture thereof. In case of the occurrence of vibrations in the prior art free-wheeling devices, the known torsion springs and cages may readily break and thereby lead to a total destruction of the free-wheeling device. For purposes of producing the clamping action for the entrainment, that is for the clutching action, wedging surfaces are present with the wedging-roller type free-wheeling devices of known construction disposed either along the internal bore of the outer part or at the external surface of the inner shaft, which wedging surfaces either have a shaft of a straight line, of a circular arc, or of a curve not accurately defined mathematically.

The wedging surfaces of the wedging-roller-type free-wheeling devices of the prior art were usually slotted or cut, broached, or milled and thereupon ground, whereby during manufacture of the outer wedging surfaces, one wedging surface after another had to be manufactured in separate operations.

SUMMARY OF THE INVENTION

The present method uses a grinding hobbing step to produce two circulate involute surfaces, that is two involute surfaces of two separate base circles, constituting the flank or face surfaces of the individual teeth of the external toothed shaft, which may be of different size and may have different inclination with respect to the respective radial direction thereof. The generating angle of the two involute tooth surfaces may thereby amount to approximately 40° to 60° and 80° to 85°, respectively. The relatively long involute surfaces form roller element wedging surfaces and the relatively short involute surfaces form free-wheeling abutment surfaces.

In known hobbing processes, for example, a continuous process for cutting straight spur gears up to a certain diameter can employ a machine having two disks which are automatically adjusted by means of a truing device and which move alternately in the longitudinal direction of the spur gear flank so that one disk only always cuts in the gap at the inner tooth end. The hobbing movement consists of a rotary motion of the blank about its axis, and a pivotal motion of the hobber post about the axis of the machine, which axis extends vertically through the tip of the cone. The two individual motions are synchronized by hobbing segments and hobbing bands. The pitch-producing step is conducted selectively after each complete run or after each forward or return passage of the disks, by means of change gears for the approximate pitch and graduated disks for the accurate pitch. Normally, the tooth is cut longitudinally crowned; in this connection, a vertical crowning is also obtained simultaneously by means of a special device having adjustable cams.

Another conventional machine likewise operates with two grinding disks embodying, in their motion, a tooth of the gear to be manufactured. The hobbing drum with two cutting disks and the workpiece participate jointly in the hobbing step. After the tooth profile has been produced by the hobbing procedure, the workpiece support is retracted and graduated while the hobbing drum reverses its direction of travel and returns to its starting position. After a number of passages which can be set beforehand, the disks are automatically trimmed. The longitudinal crowning is obtained by having the active planes of the cutting disks execute a minor hollow cone in their motion. The entire cutting procedure is controlled by a contact curve. The aforementioned conventional hobbing methods are described in "The Die Zahnradpraxis" (Gear Practice) by K. F. Keck.

It is particularly appropriate in accordance with the present invention, for the assembly and operation of the clamping or wedging-roller-type free-wheeling device, if the diameter of the bore of the outer part is larger by a few hundredths millimeters, especially if the same is larger by 0.02 to 0.05 mm. than the outer envelope diameter of the roller rim in accordance with the present invention.

In contrast to most of the known wedging-roller-type free-wheeling devices, the free-wheeling arrangement according to the present invention is additionally capable to absorb radial bearing forces, whereas the clamping or wedging-roller-type free-wheeling devices of the prior art had to be equipped for the most part with additional ball or roller bearings for purposes of absorbing radial bearing forces.

By reason of the fact that the internal diameter of the bore in the outer part in accordance with the present invention is larger, by a few hundredths millimeters, than the outer envelope diameter of the roller rim in accordance with the present invention, it is possible by the application of a momentary overpressure to press into place also the last roller member of the roller rim in the radial direction thereof with relatively slight force. Thereafter, the roller rim is arranged readily rotatably at the outer part. Even if the inner shaft is not yet inserted into the roller rim, the roller members of the rim do not collapse in themselves. Instead, the roller members of the roller rim or ring in accordance with the present invention forms a self-supporting crown. This is of particular advantage during assembly and storage of the parts, especially with assembly-line production techniques. In contradistinction to the prior art, the wedging surfaces of the wedging-roller-type free-wheeling device in accordance with the present invention, particularly the externally-toothed shaft of the wedging-roller-type free-wheeling device according to the present invention, consist of involute surfaces which are mathematically accurately defined. With the application of involute surfaces to the clamping surfaces, a very considerable simplification in the manufacture, an increased safety in operation, and a considerably longer life expectancy of the free-wheeling devices in accordance with the present invention have been obtained. The continuous hob grinding process of the present invention produces a considerably more accurate tooth configuration than would be produced by conventional milling slotting or the like processes wherein the blank is indexed for each individual tooth forming step and subsequently ground or otherwise finished on another machine requiring additional indexing so that the tooth spacing, tooth configuration and tooth spacing from the center will be inaccurate. Although symmetrical gear teeth have been formed by hobbing in the past, the present invention employs hob grinding to accurately and continuously form all of the teeth in the wedging element of a one-way clutch in one step without requiring indexing or other separate operations wherein inaccuracies may develop. Due to the inaccuracies of the prior art, not all of the roller elements are subjected to the same bearing loads during the wedging or clamping operation, which leads to an overloading of some of the roller elements therewith to a breakage of the clutch or severe limiting of its capacity.

In particular, the method for manufacturing the one-way clutch according to the present invention comprises the steps of providing a gear blank having an annular surface of revolution, providing a worm hob having an asymmetric tooth construction with an abrasive grinding surface and a fixed pitch, simultaneously continuously rotating the gear blank and the hob, simultaneously embedding the hob teeth within the surface of revolution and grinding with the abrasive grinding surface a complete toothed periphery on the gear blank of the fixed pitch with an asymmetric tooth construction comprising opposed tooth flanks of involute curvature with base circles of substantially different diameter and concentric with respect to the surface of revolution so as to form an asymmetric involute toothed first clutch element.

Since the tool edge in the hobbing cutter or grinding disk according to the present invention which actually performs the machining or cutting in a straight line, a very high accuracy in the work tool, such as the grinding disk is possible. An involute polygon produced with such a hobbing cutter in the hobbing machine by the hobbing operation is free from subdivision errors, and the distances of the wedging surfaces from the axle centers are all equal among one another. Right and left involute flanks or faces are produced at the same time and, more particularly, as indicated above, by operating the grinding hob or cutter to machine the solid stock directly.

By reason of the manufacture of the involute polygon free of any errors caused by subdivision, it is now possible that all of the roller members of the roller rim are equally loaded in the clutching condition thereof and are free in the free-wheeling condition thereof.

By reason of the further fact that, as mentioned herein above, the last roller member of the roller rim is pressed into the rim under pressure, and by reason of the fact that a self-supporting roller crown or structure is formed thereby, the operating safety of the free-wheeling device is further enhanced. The roller rim does not collapse in any position thereof. Furthermore, no individual roller member may assume an oblique or inclined position or respond prematurely. All of the roller members in the free-wheeling device according to the present invention have to exercise the same functions at the same time.

As contrasted to the wedging-roller-type free-wheeling device of the prior art, the free-wheeling device in accordance with the present invention additionally offers the advantage that, for purposes of manufacture, normally standardized, individual roller bearing parts may be used which also considerably reduces the cost of manufacture thereof.

BRIEF DESCRIPTION OF THE DRAWING

These and other objects, features and advantages of the present invention will become more apparent from the following description, when taken in connection with the accompanying drawing which shows, for purposes of illustration only, several embodiments in accordance with the present invention and wherein:

FIG. 1 is a somewhat schematic, sector-shaped partial cross-sectional view of the clamping-roller-type free-wheeling device in accordance with the present invention, the cross-section being taken perpendicular to the axial direction thereof;

FIG. 2 is a view of a blank being ground according to the hob grinding process of the present invention;

DETAILED DESCRIPTION OF THE DRAWING

Figure 3:
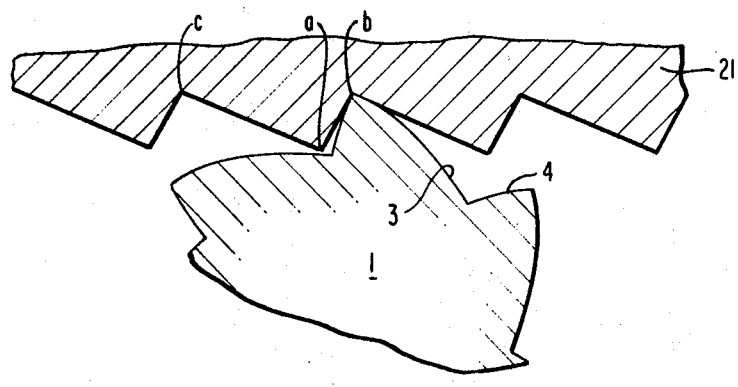
FIG. 3 is a cross-sectional view taken along line III—III of FIG. 2.

Referring now to the drawing, wherein like reference numerals are used throughout the various views to designate corresponding parts and, more particularly, to FIG. 1, reference numeral 1 designates therein a part of the externally toothed shaft provided along the outer surface thereof with identical teeth, of which one representative tooth is designated by reference numeral 2. The teeth 2 themselves are provided with teeth flanks or faces 3 and 4, respectively. The tooth face is thereby larger than the tooth face 4 thereof.

The surface of the tooth face 3 is formed as an involute surface of a circle with respect to the base circle 5 thereof. The tooth face 4 represents an involute surface of a circle with respect to the base circle 6. The centers of the two base circles 5 and 6 coincide with the center 7 of the shaft 1, as shown in FIG. 1.

The generating angle for the involute surface 3 is designated in FIG. 1 by reference character $\alpha_3$ and the generating angle for the involute surface 4 with $\alpha_4$.

The externally toothed shaft 1 is surrounded by a rim of roller members 8 disposed closely adjacent one another which abuts at the tooth face 3 and 4 of teeth 2. Reference numeral 9 thereby designates in FIG. 1 the external circular envelope formed by the roller rim which coincides or corresponds almost with the inner bore of the outer ring or part 10. The inner bore in the outer ring 10 is, therefore, also designated by reference numeral 9 in FIG. 1, even though there is a slight difference as will appear more fully hereinafter.

For purposes of explaining the operation of the free-wheeling device in accordance with the present invention, it is assumed that the flow of torque in the illustrated free-wheeling device of FIG. 1 takes place normally from the externally toothed shaft 1 to the outer ring 10 and that the shaft rotates in the direction of arrow 11, that is in the clockwise direction. This direction of rotation 11 corresponds to the free-wheeling direction of the illustrated embodiment. The abutment surfaces thereby move the individual roller members 8, which slide along the inner bore of the outer ring 10. The roller members 8 are thereby capable of carrying out such sliding movements by reason of the play produced by the fact that the internal bore of the outer ring 10, as mentioned herein above, is larger by a few hundredths millimeters than the circle envelope 9 of the roller rim. The incline or rise of the surface 4 in the radial direction is so dimensioned that no clamping of the roller members 8 ever takes place, not even in the case when the entire free-wheeling device is subjected to radial pressure loads.

If the direction of rotation of the externally toothed shaft 1 is reversed, so as to rotate in the direction of arrow 12, then the roller members 8 roll up a slight distance along the inclined surfaces 3 of the teeth 2 and are thereby clamped in the wedge-shaped spaces formed between the toothed surfaces 3 and the outer ring 10, and thereby establishing a rigid connection between the externally toothed shaft 1 and the outer ring 10. Consequently, in the direction of rotation 12, the one-way free-wheeling device is locked and effectively locks the parts 1 and 10.

In summary, it may be noted that the tooth faces 4 serve as abutment surfaces and the tooth faces 3 as wedging or clamping surfaces for the roller members 8.

As shown in FIG. 2, the worm hob 21, which can be covered with abrasive material, has straight sides a–b and a–c for rotation about its axis 22 to mesh with and grind involute teeth onto the blank 1, as also shown in cross-section in FIG. 3. In particular, the blank 1 has an annular surface of revolution and the worm hob 21 has an asymmetric tooth construction as shown in FIG. 2, with an abrasive grinding surface and a fixed pitch. In operation, the blank and the worm hob are rotated simultaneously and the hob teeth are embedded within the surface of revolution of the blank so as to form a complete toothed periphery on the blank of fixed pitch with an asymmetric tooth construction comprising opposed tooth flanks of involute curvature 3, 4 with base circles of substantially different diameter and concentric with respect to the surface of revolution, thereby forming an asymmetric involute toothed first clutch element. Thereafter, a second clutch element 10 having an internally facing surface of revolution is mounted in a relatively rotatable manner with respect to the first clutch element and uniformly spaced radially outwardly therefrom, and then providing a roller element 8 between each of the opposed blanks 3, 4 and between the toothed surface and the second clutch member 10 surface of revolution.

Figure 4:
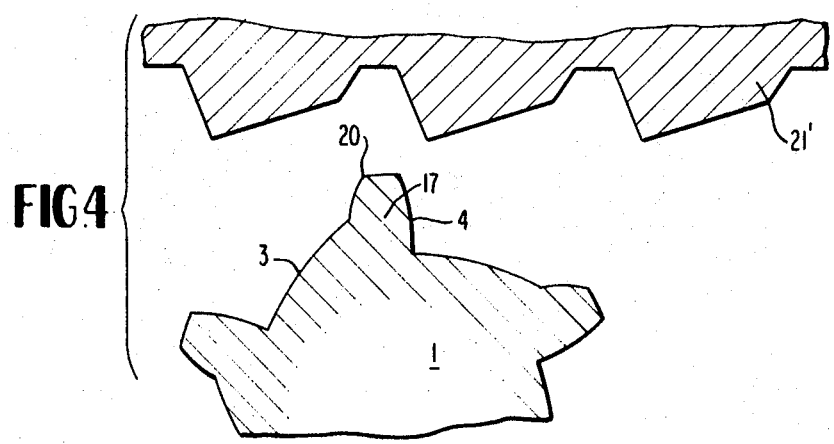
FIG. 4 is a view similar to FIG. 3, with a grinding worm hob wheel and blank separated, for the manufacture of the clutch according to FIG. 5.

In FIG. 4, the hob grinding tool 21' is shown together with the externally toothed shaft 1 of FIG. 5 formed thereby and in a manner as described herein above.

Figure 5:
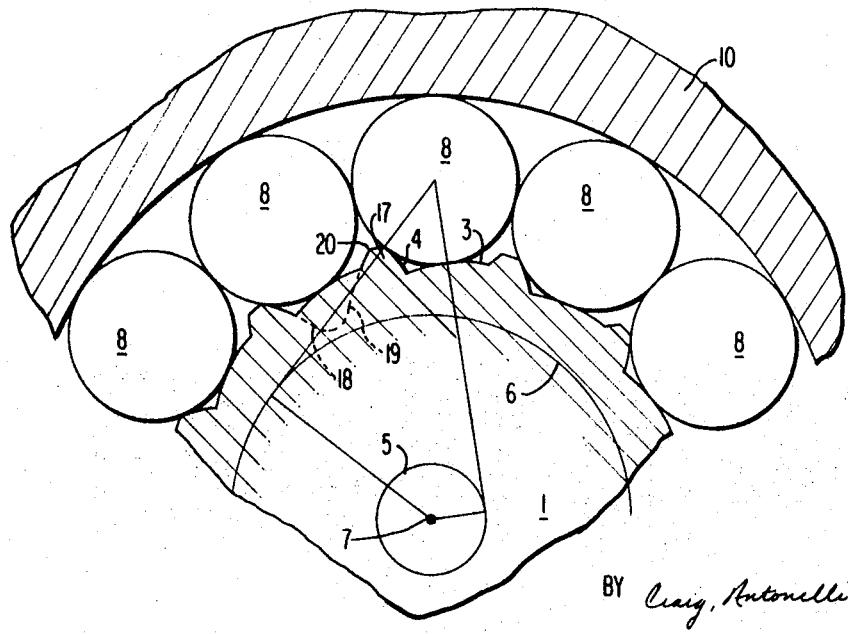
FIG. 5 is a somewhat schematic representation, similar to FIG. 1, of a second embodiment of a clamping-roller-type free-wheeling device in accordance with the present invention.

FIG. 5 shows a second embodiment of a clamping-roller-type free-wheeling arrangement according to the present invention. In this embodiment, the surface 3 is also an involute surface of a circle with respect to the base circle 5. The tooth face 4 thereby represents the involute of a circle with respect to the base circle 6. The centers of both base circles 5 and 6 again coincide with the center 7 of shaft 1.

The operation of FIG. 5 is essentially the same as the embodiment of FIG. 1. The surfaces 3 again serve as clamping wedging surfaces, whereas the surfaces 4 serve as abutment surfaces in the free-wheeling direction. The surfaces 4 are so constructed beyond the imaginary extension of the involute surface 3 that the teeth 17 are formed thereby. The teeth 17 are part of a normal involute tooth construction. The completely constructed teeth of this involute tooth construction, if completed as such, would represent tooth faces which are shown in dashed lines in FIG. 5 and are designated therein by reference numerals 18 and 19. The tooth face 19 thereby projects beyond and above the wedging surface 3, and this portion which is actually present forms, in FIG. 5, the abutment surface which is designated therein by reference numeral 20.

During free-wheeling operation, the roller members 8 abut against the faces 4 and 3, whereas only a distance of approximately 1 mm. exists to the surface 20. In the blocking direction of rotation, the roller members 8 move along the faces 3 on the shaft 1 and thereby are clamped between the shaft 1 and the outer ring 10.

All of the faces 3, 4 and 20 may be ground simultaneously in a single chucking operation in the course of the hobbing operation by means of a grinding disk.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

I claim:

1. A method for manufacturing a one-way roller element wedging clutch, comprising the steps of: providing a gear blank having an annular surface of revolution; providing a worm hob having an asymmetric tooth construction with an abrasive grinding surface and a fixed pitch; simultaneously continuously rotating the gear blank and the hob, simultaneously embedding the hob teeth within said surface of revolution and grinding with the abrasive grinding surface a complete toothed periphery on said gear blank of said fixed pitch with an asymmetric tooth construction comprising opposed tooth flanks of involute curvature with base circles of substantially different diameter and concentric with respect to the surface of revolution to form an asymmetric involute toothed first clutch element; providing a second clutch element having an internally facing surface of revolution; mounting the first and second clutch elements for relative rotation with the second clutch element surface of revolution uniformly spaced radially outwardly from the first clutch element toothed surface; providing a roller element between each of the opposed flanks, and between the toothed surface and second clutch member surface of revolution.

2. The method according to claim 1, including the step of providing a clearance between the roller elements and the second clutch element surface of revolution of approximately 0.02 to 0.05 mm. when said roller elements each engage both of their respective opposed tooth flanks.

3. The method of claim 2, wherein said step of simultaneously rotating, embedding and grinding further simultaneously produces a set of involute surfaces having a different concentric base circle than the tooth flank base circles, each forming a tooth flank extension of a corresponding one of the opposed tooth flanks with the others of the opposed tooth flanks and the set of surfaces projecting above the imaginary extensions of the corresponding ones of the opposed tooth flanks and with the other tooth flanks forming the abutment surfaces for the roller elements in the free-wheeling condition of said one-way clutch and the ones of said tooth flanks forming the wedging surfaces in the locked condition of the one-way clutch.

4. The method of claim 3, wherein said step of simultaneously rotating, embedding and grinding forms a portion of the other tooth flanks and set of involute surfaces as mirror images of each other with respect to their bisecting radii.

5. The method of claim 4, wherein said step of simultaneously rotating, embedding and grinding form only the opposed flanks, the set of involute surfaces, and a set of involute outermost surfaces having a still different concentric base circle.

6. The method of claim 1, wherein said step of simultaneously rotating, embedding and grinding forms only said opposed flanks.

7. The method of claim 1, wherein said step of simultaneously rotating, embedding and grinding further simultaneously produces a set of involute surfaces having a different concentric base circle than the tooth flank base circles, each forming a tooth flank extension of a corresponding one of the opposed tooth flanks with the others of the opposed tooth flanks and the set of surfaces projecting above the imaginary extensions of the corresponding ones of the opposed tooth flanks and with the other tooth flanks forming the abutment surfaces for the roller elements in the free-wheeling condition of said one-way clutch and the ones of said tooth flanks forming the wedging surfaces in the locked condition of the one-way clutch.

8. The method of claim 7, wherein said step of simultaneously rotating, embedding and grinding forms a portion of the other tooth flanks and set of involute surfaces as mirror images of each other with respect to their bisecting radii.

9. The method of claim 8, wherein said step of simultaneously rotating, embedding and grinding forms only the opposed flanks, the set of involute surfaces, and a set of involute outermost surfaces having a still different concentric base circle.

References Cited

UNITED STATES PATENTS

| | | | |
|---|---|---|---|
| 1,467,985 | 9/1923 | Schurr | 51—123 |
| 2,082,842 | 6/1937 | Marland | 192—45 |
| 2,404,573 | 7/1946 | Grat | 51—123 |
| 2,998,678 | 9/1961 | Beloc et al. | 51—287 X |
| 3,249,186 | 5/1966 | Kluwe | 51—287 X |

JOHN F. CAMPBELL, Primary Examiner

V. DI PALMA, Assistant Examiner

U.S. Cl. X.R.

29—557; 51—123, 287; 192—45